United States Patent
Miyazaki et al.

Patent Number: 6,109,320
Date of Patent: Aug. 29, 2000

[54] HEAVY DUTY RADIAL TIRE WITH SPECIFIED BEAD CORE INSIDE DIAMETER

[75] Inventors: Tatsuya Miyazaki, Akashi; Kiyoshi Ueyoko, Kobe, both of Japan

[73] Assignee: Sumitomo Rubber Industries, Ltd., Hyogo-ken, Japan

[21] Appl. No.: 08/870,423

[22] Filed: May 28, 1997

[30] Foreign Application Priority Data

May 28, 1996 [JP] Japan ................................. 8-133533
Oct. 18, 1996 [JP] Japan ................................. 8-276442

[51] Int. Cl.[7] ........................ B60C 15/00; B60C 15/02; B60C 15/04; B60C 15/06
[52] U.S. Cl. ................... 152/540; 152/539; 152/541; 152/543; 152/546; 152/547; 152/554
[58] Field of Search ........................... 152/539, 540, 152/543, 547, 541–542, 546, 554; 245/1.5

[56] References Cited

U.S. PATENT DOCUMENTS 5,772,811 6/1998 Ueyoko et al. ................. 152/546 X

FOREIGN PATENT DOCUMENTS 59-124415 7/1984 Japan ................................. 152/540
5-345507 12/1993 Japan ................................. 245/1.5

Primary Examiner—Adrienne Johnstone

[57] ABSTRACT

A heavy duty radial tire having improved bead durability accommodated to a standard 15 degree taper center drop rim comprises a pair of bead cores disposed one in each bead portion, a steel cord radial carcass ply turned up around the bead cores from the axially inside to the outside, a hard rubber bead apex disposed between the carcass ply main portion and each turnup portion, a bead reinforcing layer of reinforcing cords disposed axially outside each carcass ply turnup portion, and a rubber strip disposed between each turnup portion and the bead reinforcing layer, the rubber strip being harder than the bead apex, and the difference B–D of the inside diameter B of the bead cores from the rim diameter D of the rim is in the range of from –4 to 1 mm.

8 Claims, 7 Drawing Sheets

HEAVY DUTY RADIAL TIRE WITH SPECIFIED BEAD CORE INSIDE DIAMETER

BACKGROUND OF THE INVENTION

The present invention relates to a heavy duty radial tire accommodated to a 15 degree taper center drop rim. More particularly, the present invention is directed to an improved bead structure capable of preventing a carcass ply separation failure and improving bead durability.

In general, heavy duty radial tires such as truck/bus tires used under high-pressure and heavy-load conditions are provided with a steel cord carcass ply which is turned up around bead cores, and the tires are used together with a 15 degree taper center drop rim (for example, R06-1 in JATMA) wherein the rim base (bead seat) is tapered at 15 degrees to obtain a large engaging force between the tire and rim. The heavy duty tires are often used under severe condition such that the tire deflection reaches up to 15% of the tire sectional height. Under such severe conditions, a stress is liable to concentrate on the cord ends of the carcass turnup portion, and thus a separation failure from the surrounding rubber is liable to occur.

In such a heavy duty radial tire, the angle of the carcass cords is substantially 90 degrees to the tire equator, which is regarded as a cause of the concentration of the deformation because it is difficult for the carcass to lean circumferentially of the tire and also toward the rim flange.

Hitherto, therefore, as shown in FIGS. 6 and 7, the bead portions of a heavy duty radial tire have been provided with a steel cord bead reinforcing layer (d) extending along the carcass turnup portion (c1) to increase the rigidity and thus to decrease deformation.

The cords of the bead reinforcing layer (d) are inclined circumferentially of the tire for example at an angle of not more than 60 degrees to the circumferential direction of the tire so as to lean easily not only toward the rim flange (j1) but also circumferentially of the tire.

In FIG. 6, the bead filler (d) is lower in height than the outer end (ct) of the turnup portion (c1) of the carcass (c), and in order to reduce the deformation of the tire during rolling which is transmitted to the tread, belt, carcass main portion (c2), bead apex (e) and carcass turnup portion (c1), the bead filler (bead reinforcing layer) is provided to support the outside of the carcass turnup portion (c1) against the deformation to prevent the separation between the cord ends of the turnup portion (c1) and the rubber.

In FIG. 7, the bead reinforcing layer (d) is higher in height than the outer end (ct) of the carcass turnup portion (c1). In this case, the deformation of the tire during rolling is transmitted to the tread, belt, carcass main portion (c2), bead apex (e) and then to the bead reinforcing layer (d) before the carcass turnup portion (c1). Thus, the bead reinforcing layer further reduces the deformation around the outer end (ct).

As explained above, it is known to be effective to reinforce the bead portion of a heavy duty pneumatic tire by disposing a bead reinforcing layer in the bead portion.

However, the present inventors have discovered that it is also possible to improve the durability of the bead portion by decreasing the difference B–D of the inside diameter (B) of the bead core (f) of the tire from the rim diameter (D) of a 15 degree taper center drop rim. Here, the inside diameter (B) is of the tire not mounted on the rim as shown in FIG. 6.

In a conventional heavy duty tire with a steel cord carcass (c) reinforced by a bead filler (reinforcing layer) (d) extending from the radially inside of a bead core (f) toward the radially outside, as the rigidity of the bead portion is very high, the difference B–D between the inside diameter (B) of the bead core and the rim diameter (D) is set at a relatively large value of for example not less than 2 mm, giving priority to the rim mounting.

However, if the diameter difference B–D is too large, the tire bead base (g) has a tendency to move axially outwardly along the rim seat (h) when the tire is inflated, and the so called rotational stress of the carcass ply around the bead core (f) increases and the deformation of the bead portion also increases. Further, the bead compression between the bead core (f) and the rim seat (h) decreases, which produces the problems of carcass ply slipping-out, carcass ply turnup loose and the like.

On the other hand, the rubber thickness between the carcass cords and the bead filler cords, measured at the bead filler end (dt) in FIG. 6 and the carcass turnup end (ct) in FIG. 7, is usually set at a very small value of under 1.0 mm. Thus, in spite of the provision of the bead filler (d), a stress concentration occurs on the ends (dt) in FIG. 6 and (ct) in FIG. 7, and as a result, a separation failure (PTL: Ply Turnup Loose) starting from these ends is liable to occur.

SUMMARY OF THE INVENTION

Therefore, the primary object of the present invention is to provide to provide a heavy duty pneumatic tire in which the bead durability is effectively improved.

Another object of the present invention is to mitigate the stress tending to concentrate on the outer end of the carcass turnup portion or the bead reinforcing layer whichever which is lower, to prevent ply separation and thus to improve bead durability.

According to one aspect of the present invention, a heavy duty radial tire to be mounted on a standard 15 degree center drop rim comprises a pair of bead portions, each with a bead core therein, a radial carcass made of steel cords extending between the bead portions and turned up around the bead cores from the axially inside to the outside thereof to form a pair of turnup portions and a main portion disposed therebetween, a hard rubber bead apex disposed between the main portion and each turnup portion and extending radially outwardly from the bead core, a bead filler (reinforcing layer comprising a ply of reinforcing cords disposed axially outside each turnup portion and extending radially outwardly from a position radially inward of the bead core, wherein the difference B–D of the inside diameter B of the bead cores from the rim diameter D of the rim is in the range of from −4 to 1 mm.

By setting the diameter difference B–D at a considerably small value, the bead deformation is decreased, and the bead compression is increased. As a result, carcass ply slip-out, loose carcass ply turnup and the like can be prevented.

Preferably, the carcass consists of a single ply, the bead filler consists of a single ply of steel cords, and a rubber strip is disposed between each turnup portion and the bead filler (reinforcing layer), wherein the rubber strip extends at least from a point between each turnup portion and the bead filler to a radially outer end of the turnup portion or the bead reinforcing layer whichever is higher than the other, and the rubber strip has a thickness such that the distance between the carcass cords and the steel bead filler cords measured at the radially outer end of the turnup portion or the bead reinforcing layer which is lower than the other is in the range of from 2.5 to 5.0 times the diameter of the carcass cords.

By setting the distance wider than the conventional range, depending on the carcass cord diameter, the stress concentration on the cord ends can be mitigated, to prevent a ply separation failure and the bead durability is further improved.

Further, the JIS-A hardness of the rubber strip is preferably set in the range of from 70 to 90 degrees and larger than the JIS-A hardness of the bead apex by not less than 10 degrees.

When the carcass is composed of a plurality of plies and/or the bead reinforcing layer is composed of a plurality of plies, the radially outermost end (highest end) is used for the radially outer end of the carcass turnup portion and the radially outer end of the bead filler.

BRIEF DESCRIPTION OF THE DRAWINGS

Embodiments of the present invention will now be described in detail in conjunction with the accompanying drawings, wherein.

DETAILED DESCRIPTION OF THE INVENTION

Figure 1:
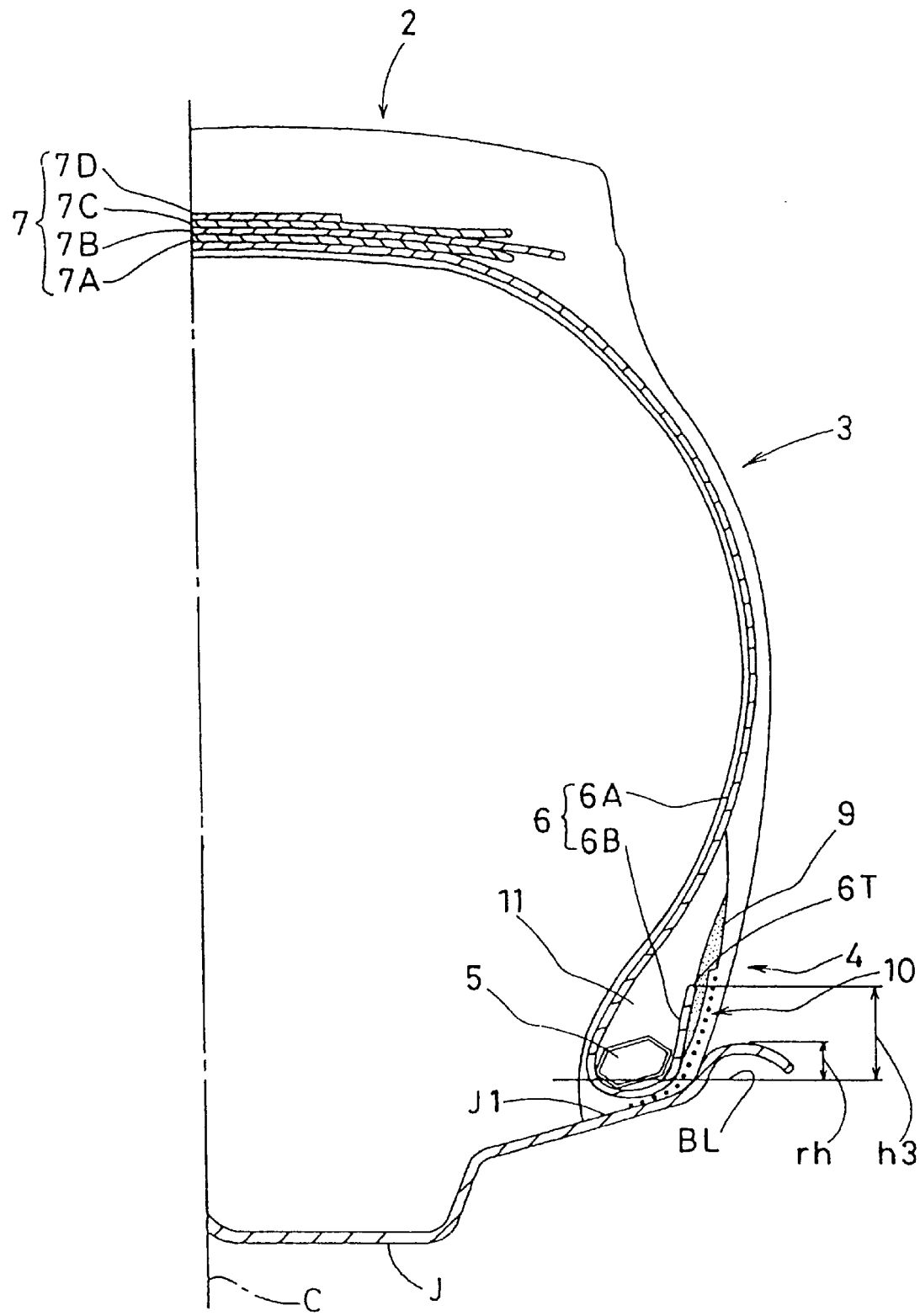
FIG. 1 is a cross sectional view of an embodiment of the present invention.

In FIG. 1, the heavy duty radial tire according to the present invention is a truck/bus tire, and the state in which the tire is mounted on a standard rim J (that is a 15 degree taper center drop rim) and inflated to a standard inner pressure is schematically shown.

The heavy duty radial tire comprises a tread portion 2, a pair of sidewall portions 3, a pair of bead portions 4 with a bead core 5 therein, a carcass 6 extending between the bead portions, and a belt 7 disposed radially outside the carcass 6 and inside the tread portion 2.

Each bead portion 4 is provided with a bead apex 11, a chafer 14 and a bead filler 10 to reinforce this portion.

The carcass 6 comprises at least one ply of steel cords arranged radially at an angle of 90 to 80 degrees with respect to the tire equator and extending between the bead portions and turned up around the bead cores 5 from the axially inside to the outside thereof to form a pair of turnup portions 6B and one main portion 6A therebetween.

In this embodiment, the carcass 6 consists of a single ply of steel cords arranged at substantially 90 degrees to the tire equator.

The radially outer end 6T of the turnup portion 6B is set at a relatively low height such that its height h3 from the bead base line BL (corresponding to the rim diameter) is 1.0 to 4.0 times, more preferably 1.6 to 3.0 times the flange height (rh) of the 15 degree taper center drop rim J, so as to have the so called low turnup structure. If the turnup height h3 is less than 1.0 times the flange height (rh), the turnup portion 6B is liable to slip out of the bead portion toward the main portion 6A. If the height h3 is more than 4.0 times the flange height (rh), the turnup end 6T approaches the sidewall portion 3 where the bending deformation is the largest and thus the turnup ply loose is liable to occur near the outer end 6T.

Further more, the tire weight increases when using a longer turnup portion. Generally, the flange height (rh) of the 15 degree taper center drop rims is 12.7 mm.

The belt 7 comprises at least two cross plies of parallel steel cords, although in this embodiment four plies of steel cords are utilized. For example, the radially innermost first ply 7A is composed of rubberized steel cords laid in parallel with each other at an angle of 60±10 degrees with respect to the tire equator C. Similarly, the radially outer second, third and fourth plies 7B, 7C and 7D are each composed of steel cords laid at a small angle of from 15 to 30 degrees with respect to the tire equator C.

Figure 2:
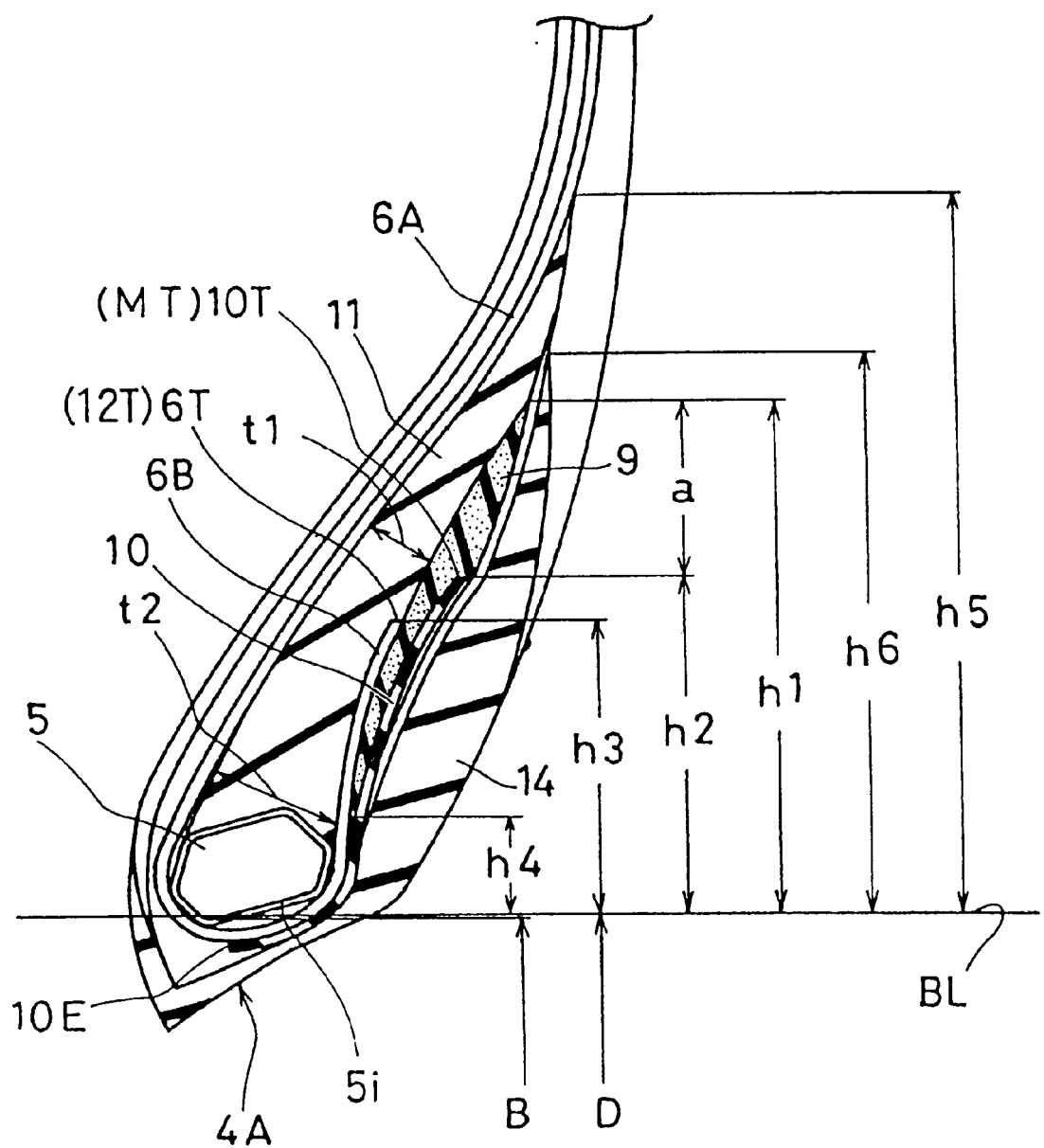
FIG. 2 is a cross sectional view of the bead portion thereof showing an example of the bead structure.
Figure 4:
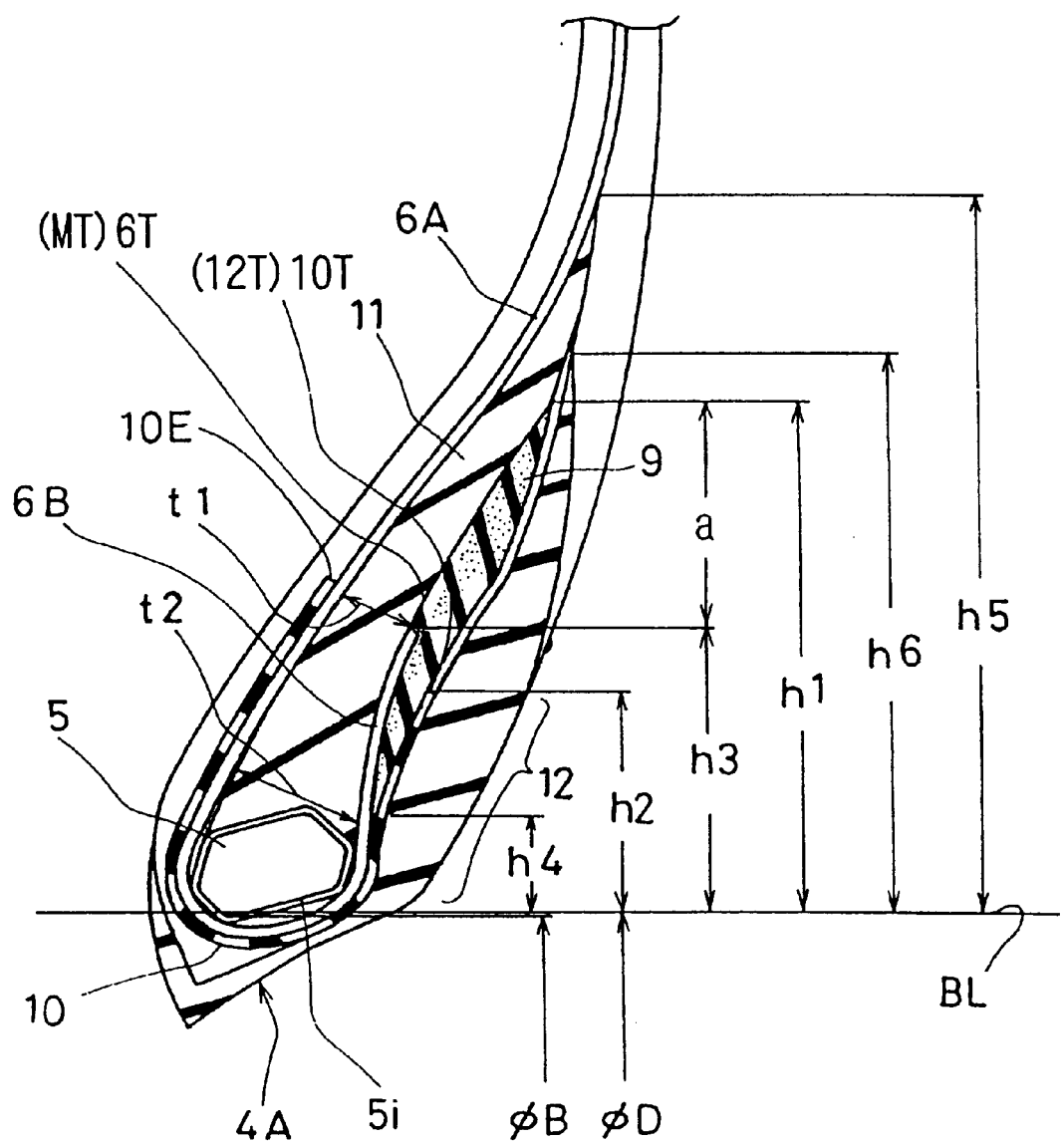
FIG. 4 is a cross sectional view of another example of the bead portion according to the present invention.
Figure 5:
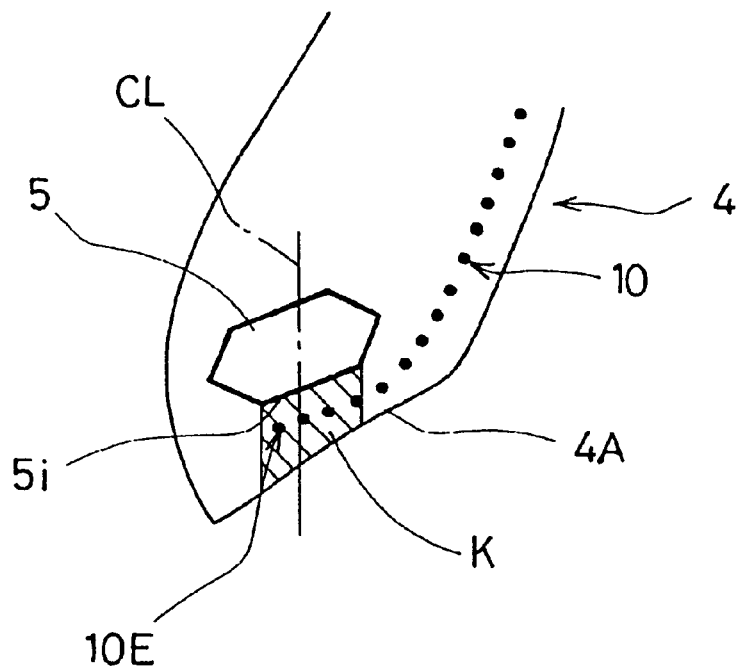
FIG. 5(a) and FIG. 5(b) are schematic cross sectional views explaining the position for the end 10E of the bead filler.
Figure 5:
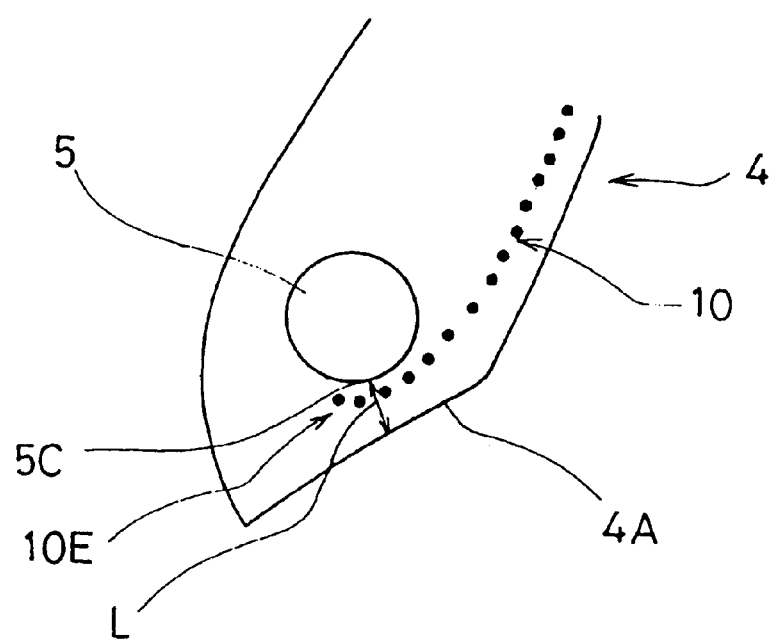
Figure 6:
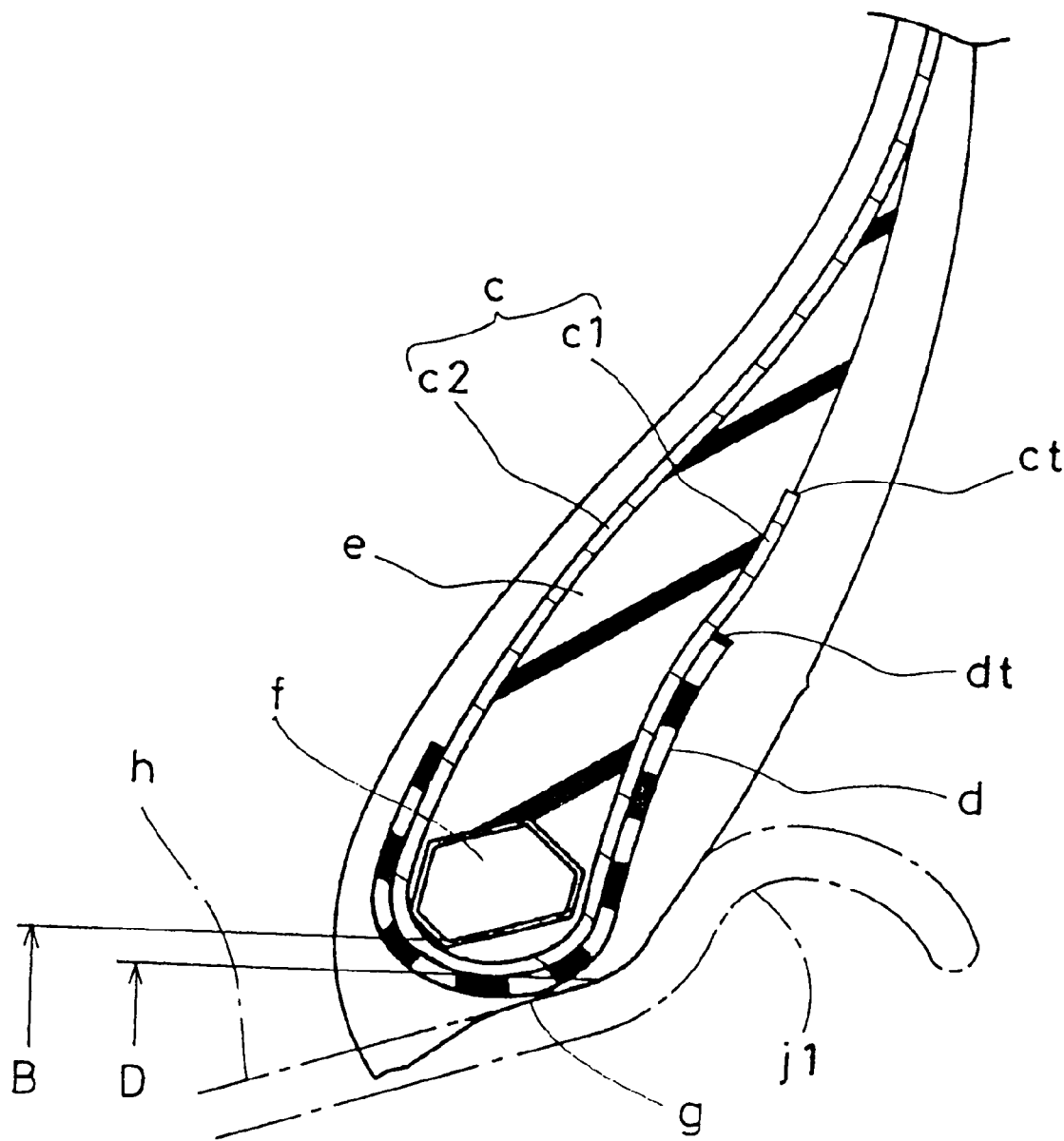
FIGS. 6 and 7 are schematic cross sectional views of the conventional bead portions.
Figure 7:
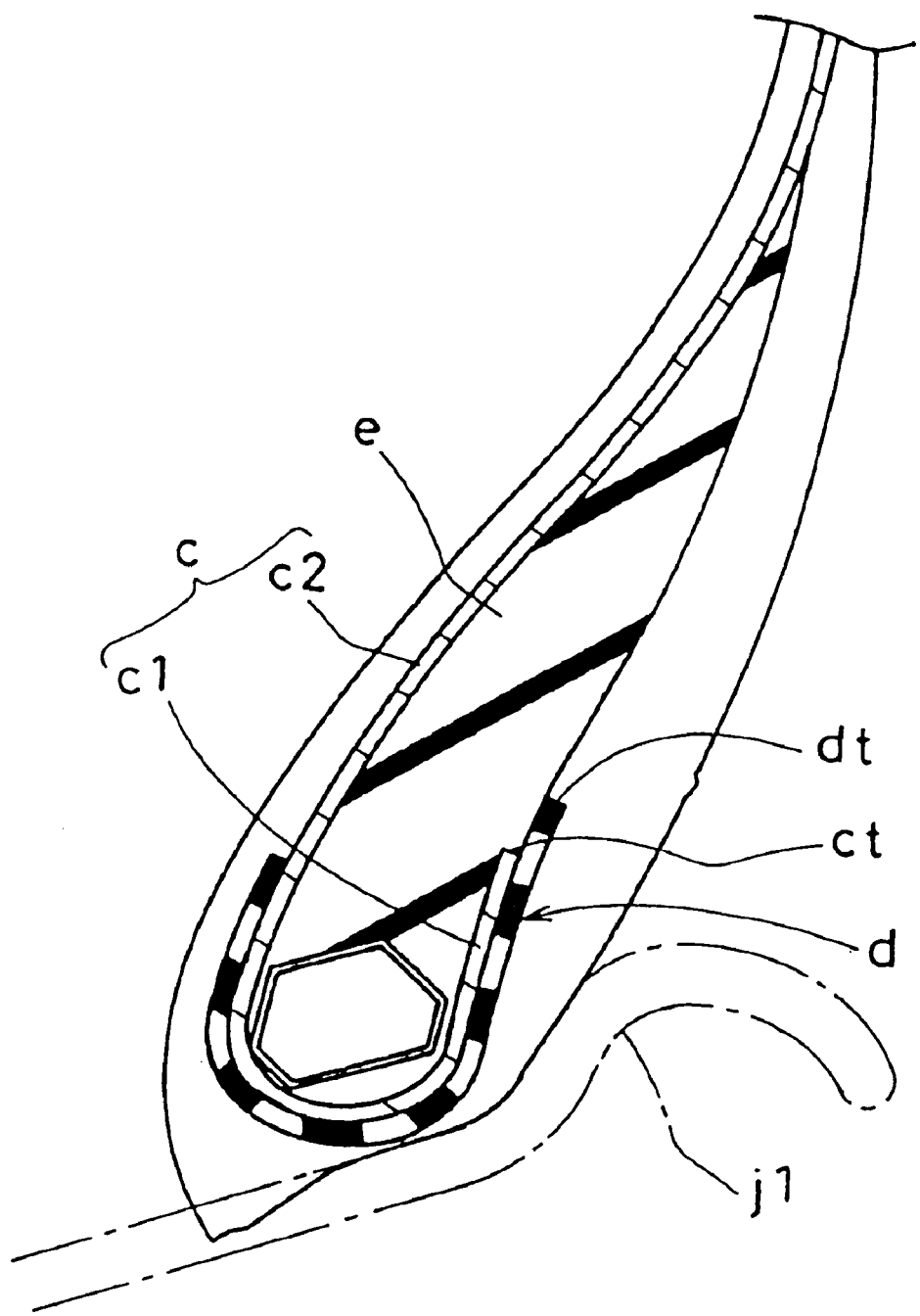

The bead core 5 is composed of windings of a steel wire. In order to withstand severe conditions and display a tight hoop effect, the cross sectional shape of the bead core shown in FIGS. 1,2 and 4 is a flat hexagon of which a relatively long bottom side 5i becomes substantially parallel to the rim base J1 when mounted. However, it is also possible to use another cross sectional shape, for example a circle as shown in FIG. 5(b).

The bead apex 11 is made of a hard rubber compound preferably having a JIS-A hardness A2 of 50 to 70 degrees, and disposed between the carcass main portion 6A and each turnup portion 6B and tapers radially outward from the radially outside of the bead core 5. It is also possible to use a bead apex made of two or more compounds having different hardness.

The chafer 14 extends along the bead base 4A and the axially outer surface of the bead portion to protect the bead portion 4 from rim chafing. The chafer 14 is made of a relatively hard rubber compound having a JIS-A hardness of from 70 to 90 degrees.

The bead reinforcing layer 10 is composed of at least one ply, in this embodiment a single ply, of parallel steel cords 13 disposed axially outside the carcass turnup portion 6B. The steel cords 13 in each ply are inclined in the same direction at an angle of 15 to 60 degrees, in this example 25 degrees, with respect to the circumferential direction of the tire, whereby, the bead filler can lean axially and circumferentially of the tire.

In view of the bead durability, rim mounting and tire weight, it is preferable that the bead filler 10 is composed of a single ply of steel cords. However, the bead filler 10 can be composed of a single ply of organic fiber cords, and further two or more plies of steel cords, organic fiber cords, or a combination of steel and organic fiber cords.

In FIG. 2, the bead reinforcing layer 10 extends radially outwardly beyond the radially outer end 6T of the carcass turnup portion 6B.

In FIG. 4, however, the bead filler 10 terminates under the radially outer end 6T of the carcass turnup portion 6B.

The absolute value of the difference |h2−h3| between the height h2 of the radially outer end 10T of the bead reinforcing layer 10 and the height h3 of the radially outer end 6T of the carcass turnup portion 6B, both measured from the bead base line BL, is preferably set in the range of from 5 to 25 mm.

If the difference |h2−h3| is under 5 mm, the ends of the bead reinforcing layer 10 and the carcass turnup portion 6B approach each other, and the stress concentrates on this part and thus damage is liable to occur.

If the difference is over 25 mm, the effect to further reduce the deformation can not be increased.

This limitation is applied to both the case where the height h3 is less than the height h2 as shown in FIG. 2, and the case where the height h3 is more than the height h2, as shown in FIG. 4.

In the later case, as specifically shown in FIG. 4, the effect to reduce the deformation near the outer end 6T becomes insufficient when the difference |h2−h3| is over 25 mm.

Further, the bead reinforcing layer 10 extends radially inwardly to a position radially inward of the bead core 5 to be secured under the bead core.

Therefore, in case of the above-mentioned flat hexagonal bead core, as shown in FIG. 5(a), it is necessary that a part of the bead reinforcing layer 10 is located in the region K between the bottom 5i of the bead core and the bead base 4A. For the dimensional and positional accuracy of the bead filler 10 and the durability of the bead portion, preferably the radially inner end 10E of the bead filler 10 is disposed axially inward of the axial center line CL of the bead core 5.

Further, in case of the bead core 5 having a circular cross sectional shape, as shown in FIG. 5(b), it is necessary that the bead filler extends axially inward beyond an inner point 5C of the bead core at which the distance L between the bead core 5 and the bead base 4A is minimum.

Furthermore, in the case of FIG. 2, the radially inner end 10E of the bead reinforcing layer 10 is disposed at a position under the bead core 5 slightly beyond the center line CL of the bead core.

In the case of FIG. 4, the bead reinforcing layer 10 extends axially inwardly through the radially inside of the bead core 5 and then radially outwardly along the axially inside of the carcass main portion, and the axially inner end 10E thereof reaches to a relatively higher position but almost equal to the carcass turnup end 6T.

Accordingly, the bead reinforcing layer 10 is secured under the bead core 5 by an improved bead compression, and overlaps the carcass turnup portion 6B by a certain width 12. Thus, due to the overlap portion 12, it becomes possible to reduce the deformation around the outer end 6T of the carcass turnup portion.

Further, the difference B−D between the rim diameter D of the 15 degree taper center drop rim and the inside diameter B of the bead cores 5 is set in the range of from −4 to 1 mm.

Here, the inside diameter B is defined as of the radially inner extreme end of the bead core 5 when the tire is not mounted on the rim.

The rim diameter D is in accord with the definition for 15 degree taper center drop rims specified in the standard, e.g. JATMA, ETRTO, TRA and the like and thus well known in the art. As the difference B−D is very small in comparison with the conventional value of at least 2 mm, the bead deformation caused by tire inflation can be reduced, and further the bead compression is increased. Therefore, carcass ply slip-out and loose ply turnup can be prevented. By setting the difference B−D in the range of from −4 to 0 mm, advantageously −4 to −2 mm, the bead compression is further increased and the bead durability is further improved. If the difference B−D is less than −4 mm, the rim mounting operation has a tendency to become difficult. In view of this, the difference is set in the range of −2 to 1 mm, more preferably 0 to 1 mm.

If importance is attached to the total balance, the difference B−D can be set in the range of from −2 to 0.5 mm.

In both the examples shown in FIGS. 2 and 4, each bead portion is further provided with a rubber strip 9 between the carcass turnup portion 6B and the bead filler 10.

The rubber strip 9 is made of a hard rubber compound having a JIS-A hardness A1 of from 70 to 90 degrees, more preferably 80 to 90 degrees.

It is preferable that the difference A1−A2 of the JIS-A hardness A1 of the strip 9 from the JIS-A hardness A2 of the bead apex is not less than 10 degrees, more preferably not less than 15 degrees, but not more than 20 degrees.

The rubber strip 9 extends at least from a higher outer end MT of the carcass turnup portion 6B or the bead reinforcing layer 10 whichever is higher to the lower outer end 12T other than the higher end MT.

That is, the higher outer end MT is the bead reinforcing layer end 10T in case of FIG. 2, but the turnup end 6T in FIG. 4. Accordingly, the lower outer end 12T is the turnup end 6T in FIG. 2, but the bead reinforcing end 10T in case of FIG. 4.

Preferably, the rubber strip 9 further extends radially outwardly beyond the higher outer end MT and radially inwardly beyond the lower outer end 12T, while tapering towards its radially inner and outer ends.

The difference (a) between the height h1 of the radially outer end of the rubber strip 9 and that of the higher outer end MT is preferably in the range of from 0.25 to 1.0 times the height of the higher outer end MT (that is, h2 in FIG. 2, and h3 in FIG. 4), each height measured radially from the bead base line BL.

If the height h1 is not more than that of the higher outer end MT, a great difference in modulus from the rubber disposed radially outside the rubber strip 9 is formed, and bead filler loose ply is liable to occur.

Further, the radially inner end of the rubber strip 9 is preferably positioned sideways of the bead core 5, and/or the height h4 thereof is set in the range of not more than 80% of the height of the lower outer end 12T (that is, h3 in FIG. 2, and h2 in FIG. 4) to avoid the occurrence of a large rigidity difference.

The thickness of the rubber strip 9 is designed such that the distance (b) between the carcass cords 15 and the bead reinforcing steel cords 13 measured at the lower outer end 12T (6T in FIGs.2, and 10T in FIG. 4) along the shortest path is preferably set in the range of from 2.5 to 5.0 times the carcass cord diameter K.

As the minimum distance (b) is set depending on the carcass cord diameter K or the carcass cord rigidity, the stress concentration caused around the carcass cord ends can be mitigated to prevent the turnup portion 6B from separating, and thus the bead durability is further improved.

If the distance (b) is less than 2.5 times the carcass cord diameter K, the share between the carcass cords 15 and the bead filler cords 13 is liable to increase.

If the distance (b) is more than the carcass cord diameter K, the heat generation from the bead portion increases. Further, the rim mounting becomes poor and the tire weight increases.

Figure 3:
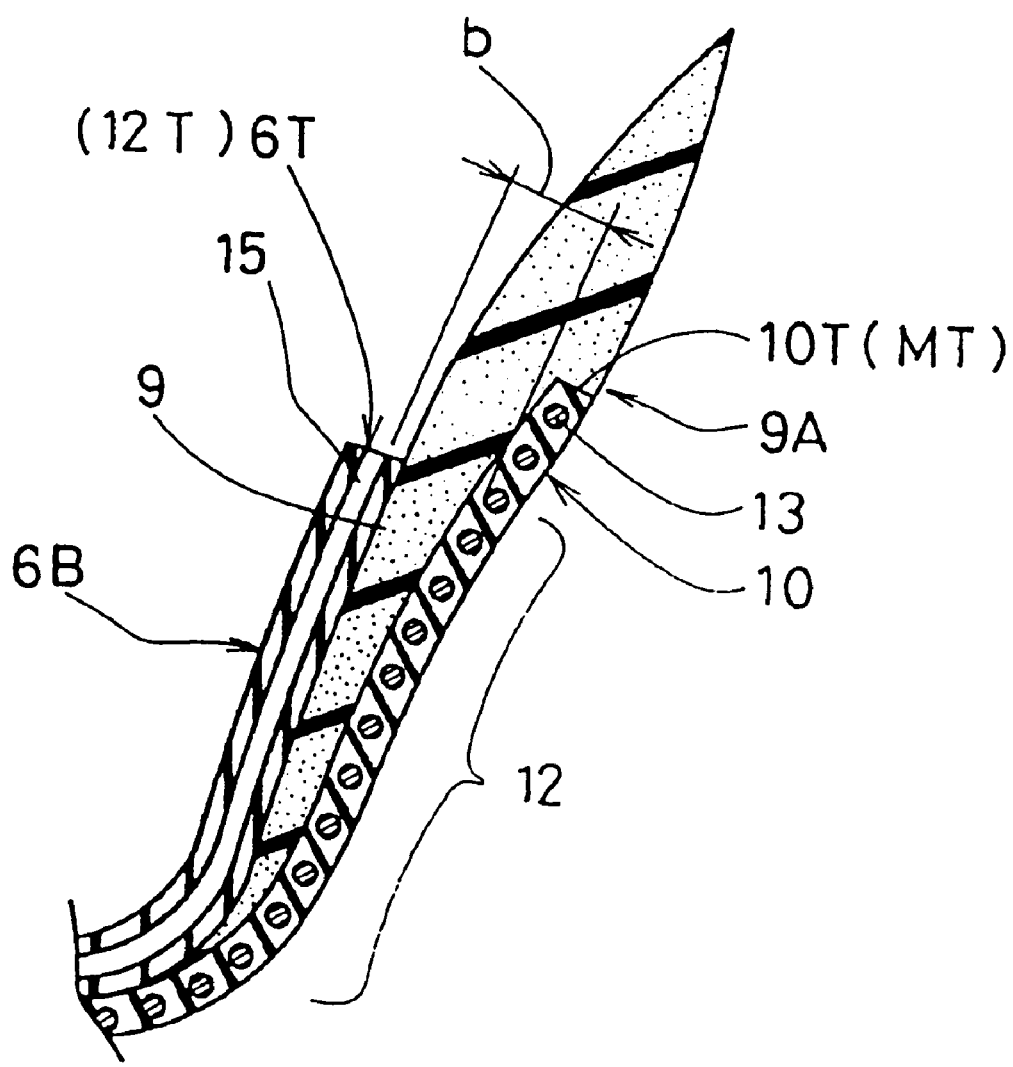
FIG. 3 is an enlarged partial view thereof.

In the example shown in FIG. 2, the rubber strip 9 is provided on the axially outer surface with a step difference in level by which the axially outer surface of the bead filler 10 has the same level as the axially outer surface of a radially outer part of the rubber strip 9 as shown in FIG. 3, whereby the higher outer end 10T is almost covered by the rubber strip 9 to prevent the cord ends from separating. The rubber strip 9 has a maximum thickness at a middle point immediately radially outside the higher outer end 10T, and the thickness gradually decreases radially inwardly and outwardly therefrom.

In the example shown in FIG. 4, contrary, the rubber strip 9 is provided on the axially inner surface with a step difference in level by which the axially inner surface of the carcass turnup portion 6B has the same level as the axially inner surface of a radially outer part of the rubber strip 9, whereby the higher outer end 6T is almost covered by the rubber strip 9 to prevent the cord ends from separating. And similar to the FIG. 2 example, the rubber strip 9 has a maximum thickness at a middle point immediately radially outside the higher outer end 6T, and the thickness gradually decreases radially inwardly and outwardly therefrom.

In order that the rubber strip 9 functions well together with the bead apex 11, the thickness of the bead apex 11 is preferably designed to satisfy the following condition:

the thickness ($t1$) measured at the higher outer end MT is 0.3 to 0.8 times the thickness ($t2$) measured immediately outside the bead core 5: and the height $h5$ of the bead apex is more than the height $h1$ of the rubber strip 9.

Further, according to such arrangements, the above-mentioned rubber chafer 14 is preferably formed such that the tapered radially outer end thereof has a height $h6$ of more than the height $h3$ of the carcass turnup portion 6B, and more than the height hi of the rubber strip 9, but less than the height $h5$ of the bead apex 11.

Comparison Tests

Test tires of 11R22.5 16PR in size for truck and bus were made by way of test.

In the test tires, the carcass was composed of a single ply of steel cords, the cord structure was 3/0.20+7/0.23, and the cord angle was 90 degrees to the tire equator. The belt was composed of four plies of steel cords, the cord structure was 1×3/0.20+6/0.35, and the cord angles to the tire equator and inclining directions were 67 degrees right, 18 degrees right, 18 degrees right, and 18 degrees left, in the order from the radially inside to the outside. The bead filler was composed of a single ply of steel cords, the cord structure was 3/0.17+7/0.20, and the cord angle was 25 degrees to the tire equator.

Other specifications are given in Table 1.

Each test tire was tested for bead durability and a rim mounting operation as follows.

1) Durability test

Using a tire drum tester, the test tire was continuously run under the following accelerated conditions until visible damage occurred on the outside of the bead portion, and the running distance was measured.

Running speed: 20 km/h

Tire load: 300% of the maximum load (9000 kgf)

Inner pressure: Normal pressure of 8.00 kgf/sq.cm

Wheel rim: 22.5×8.25 standard rim (15 degree taper center drop rim)

In Table 1, the running distance is indicated by an index based on that Ref. 1 tire is 100, where the larger value is better.

2) Rim mounting test

The time required to mount each test tire on a standard rim by hand was measured. To minimize the error, the average value of five persons' times was used in this evaluation. In Table 1, the meanings of the symbols A, B, C and D are as follows:

A: Time $\leq$ 5 minutes

B: 5<Time $\leq$ 10 minutes

C: 10<Time<20 minutes

D: It was impossible to mount the tire by one person.

Through the tests, it was confirmed that the tires according to the present invention are improved in the bead durability. Further, it was found that the best value for B–D is 0.5 mm, the best range for b/K is 2.5 to 3.4, the best range for A1–A2 is 10 to 15 degrees.

TABLE 1

| Tire | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Bead | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 |
| h1 (mm) | 57 | 57 | 57 | —7 | 57 | 57 | 57 | 57 | 57 | 57 | 57 | 57 |
| h2 (mm) | 37 | 37 | 37 | 37 | 37 | 37 | 37 | 37 | 37 | 37 | 37 | 37 |
| h3 (mm) | 32 | 32 | 32 | 32 | 32 | 32 | 32 | 32 | 32 | 32 | 32 | 32 |
| h4 (mm) | 8 | 8 | 8 | — | 8 | 8 | 8 | 8 | 8 | 8 | 8 | 8 |
| h5 (mm) | 80 | 80 | 80 | 80 | 80 | 80 | 80 | 80 | 80 | 80 | 80 | 80 |
| h2–h3 (mm) | 5 | 5 | 5 | 5 | 5 | 5 | 5 | 5 | 5 | 5 | 5 | 5 |
| a (mm) | 20 | 20 | 20 | — | 20 | 20 | 20 | 20 | 20 | 20 | 20 | 20 |
| a/h2 | 0.54 | 0.54 | 0.54 | — | 0.54 | 0.54 | 0.54 | 0.54 | 0.54 | 0.54 | 0.54 | 0.54 |
| rh (mm) | 12.7 | 12.7 | 12.7 | 12.7 | 12.7 | 12.7 | 12.7 | 12.7 | 12.7 | 12.7 | 12.7 | 12.7 |
| h3/rh | 2.5 | 2.5 | 2.5 | 2.5 | 2.5 | 2.5 | 2.5 | 2.5 | 2.5 | 2.5 | 2.5 | 2.5 |
| b (mm) | 3 | 4.5 | 2.2 | 1.3 | 3 | 3 | 3 | 3 | 3 | 3 | 3 | 3 |
| K (mm) | 0.89 | 0.89 | 0.89 | 0.89 | 0.89 | 0.89 | 0.89 | 0.89 | 0.89 | 0.89 | 0.89 | 0.89 |
| b/K | 3.4 | 5.1 | 2.5 | 1.5 | 3.4 | 3.4 | 3.4 | 3.4 | 3.4 | 3.4 | 3.4 | 3.4 |
| t1 (mm) | 11 | 11 | 11 | 11 | 11 | 11 | 11 | 11 | 11 | 11 | 11 | 11 |
| t2 (mm) | 18 | 18 | 18 | 18 | 18 | 18 | 18 | 18 | 18 | 18 | 18 | 18 |
| t1/t2 | 0.61 | 0.61 | 0.61 | 0.61 | 0.61 | 0.61 | 0.61 | 0.61 | 0.61 | 0.61 | 0.61 | 0.61 |
| A2 (deg) | 60 | 60 | 60 | 60 | 60 | 60 | 60 | 60 | 60 | 60 | 60 | 60 |
| A1 (deg) | 80 | 80 | 80 | non | 80 | 80 | 80 | 80 | 75 | 70 | 60 | 80 |
| A1–A2 | 20 | 20 | 20 | — | 20 | 20 | 20 | 20 | 15 | 10 | 0 | 20 |
| B (mm) | 568 | 568 | 568 | 568 | 567.5 | 569.5 | 571.5 | 572.5 | 568 | 568 | 568 | 572 |
| D (mm) | 571.5 | 571.5 | 571.5 | 571.5 | 571.5 | 571.5 | 571.5 | 571.5 | 571.5 | 571.5 | 571.5 | 571.5 |
| B–D (mm) | −3.5 | −3.5 | −3.5 | −3.5 | −4 | −2 | 0 | 1 | −3.5 | −3.5 | −3.5 | 0.5 |
| Durability | 180 | 165 | 175 | 150 | 190 | 175 | 155 | 140 | 180 | 170 | 135 | 150 |
| Rim mounting | C | C | C | C | C | B | A | A | B | B | B | A |

TABLE 1-continued

| Tire | Ex. 13 | Ex. 14 | Ex. 15 | Ex. 16 | Ex. 17 | Ex. 18 | Ex. 19 | Ref. 1 | Ref. 2 | Ex. 20 | Ex. 21 | Ref. 3 |
|---|---|---|---|---|---|---|---|---|---|---|---|---|
| Bead | FIG. 2 | FIG. 2 | FIG. 2 | FIG. 2 | FIG. 2 | FIG. 2 | FIG. 2 | FIG. 2 | FIG. 2 | FIG. 4 | FIG. 4 | FIG. 4 |
| h1 (mm) | 57 | 57 | 57 | —7 | 57 | 57 | 57 | — | 57 | 57 | 57 | 57 |
| h2 (mm) | 37 | 37 | 37 | 37 | 37 | 37 | 37 | 37 | 37 | 32 | 32 | 32 |
| h3 (mm) | 32 | 32 | 32 | 32 | 32 | 32 | 32 | 32 | 32 | 37 | 37 | 37 |
| h4 (mm) | 8 | 8 | 8 | 8 | 8 | 8 | 8 | — | 8 | 8 | 8 | 8 |
| h5 (mm) | 80 | 80 | 80 | 80 | 80 | 80 | 80 | 80 | 80 | 80 | 80 | 80 |
| h2–h3 (mm) | 5 | 5 | 5 | 5 | 5 | 5 | 5 | 5 | 5 | −5 | −5 | −5 |
| a (mm) | 20 | 20 | 20 | 20 | 20 | 20 | 20 | — | 20 | 20 | 20 | 20 |
| a/h2 | 0.54 | 0.54 | 0.54 | — | 0.54 | 0.54 | 0.54 | — | 0.54 | 0.54 | 0.54 | 0.54 |
| rh (mm) | 12.7 | 12.7 | 12.7 | 12.7 | 12.7 | 12.7 | 12.7 | 12.7 | 12.7 | 12.7 | 12.7 | 12.7 |
| h3/rh | 2.5 | 2.5 | 2.5 | 2.5 | 2.5 | 2.5 | 2.5 | 2.5 | 2.5 | 2.9 | 2.9 | 2.9 |
| b (mm) | 6 | 4.5 | 2.2 | 1.3 | 3 | 3 | 3 | 1 | 3 | 3 | 1.3 | 1.3 |
| K (mm) | 0.89 | 0.89 | 0.89 | 0.89 | 0.89 | 0.89 | 0.89 | 0.89 | 0.89 | 0.89 | 0.89 | 0.89 |
| b/K | 6.7 | 5.1 | 2.5 | 1.5 | 3.4 | 3.4 | 3.4 | 1.5 | 3.4 | 3.4 | 3.4 | 3.4 |
| t1 (mm) | 11 | 11 | 11 | 11 | 11 | 11 | 11 | 11 | 11 | 10 | 10 | 10 |
| t2 (mm) | 18 | 18 | 18 | 18 | 18 | 18 | 18 | 18 | 18 | 18 | 18 | 18 |
| t1/t2 | 0.61 | 0.61 | 0.61 | 0.61 | 0.61 | 0.61 | 0.61 | 0.61 | 0.61 | 0.56 | 0.56 | 0.56 |
| A2 (deg) | 60 | 60 | 60 | 60 | 60 | 60 | 60 | 60 | 60 | 60 | 60 | 60 |
| A1 (deg) | 80 | 80 | 80 | 80 | 80 | 80 | — | 80 | 80 | 80 | 80 | 80 |
| A1–A2 | 20 | 20 | 20 | 20 | 15 | 10 | 0 | — | 20 | 20 | 20 | 20 |
| B (mm) | 572 | 572 | 572 | 572 | 572 | 572 | 572 | 574 | 568.5 | 572 | 572 | 574 |
| D (mm) | 571.5 | 571.5 | 571.5 | 571.5 | 571.5 | 571.5 | 571.5 | 571.5 | 571.5 | 571.5 | 571.5 | 571.5 |
| B–D (mm) | 0.5 | 0.5 | 0.5 | 0.5 | 0.5 | 0.5 | 0.5 | 2.5 | −5 | 0.5 | 0.5 | 2.5 |
| Durability | 125 | 140 | 145 | 125 | 150 | 140 | 120 | 100 | 180 | 160 | 135 | 90 |
| Rim mounting | A | A | A | A | A | A | A | A | D | A | A | A |

We claim:

1. A heavy duty radial tire for mounting on a standard 15 degree center drop rim comprising a pair of bead portions, each with a bead core therein, a radial carcass made of steel cords extending between the bead portions and turned up around the bead cores from axially inside to the outside thereof to form a pair of turnup portions and a main portion disposed therebetween, a hard rubber bead apex disposed between the main portion and each turnup portion and extending radially outwardly from the bead core, a bead reinforcing layer comprising a ply of reinforcing cords disposed axially outside each turnup portion and extending radially outwardly from a position radially inward of the bead core, a rubber strip disposed between each turnup portion and the bead reinforcing layer, the rubber strip extending at least from the lower radially outer end of the turnup portion or the bead reinforcing layer, whichever is lower, to the upper radially outer end of the turnup portion or the bead reinforcing layer, whichever is higher, the rubber strip having a thickness such that the minimum distance between the carcass cords and the bead reinforcing cords measured at the radially outer end of the turnup portion or the bead reinforcing layer, whichever is lower, is in the range of from 2.5 to 5.0 times the diameter of the carcass cords, the rubber strip having a JIS-A hardness of 70 to 90 degrees and larger than the JIS-A hardness of the bead apex by not less than 10 degrees, and the difference B–D of the inside diameter B of the bead cores from the rim diameter D of the rim being in the range of from −4 to 1 mm.

2. The heavy duty radial tire according to claim 1, wherein the carcass consists of a single ply, and the bead reinforcing layer consists of a single ply of steel cords.

3. The heavy duty radial tire according to claim 2, wherein said steel cords are inclined in the same direction at an angle of 15 to 60 degrees with respect to the circumferential direction of the tire.

4. The heavy duty radial tire according to claim 2, wherein each bead portion has a base and a chafer is provided which extends along the base of the bead portion and the axially outer surface of the bead portion, said chafer being made of a relatively hard rubber compound having a JIS-A hardness of from 70 to 90 degrees.

5. The heavy duty radial tire according to claim 4, wherein when the tire is mounted on the rim and inflated to a standard inner pressure the rubber chafer is formed such that the tapered, radially outer end thereof has a height more than the height of the radially outer end of the turnup portion, and more than the height of the radially outer end of the rubber strip, but less than the height of the bead apex.

6. The heavy duty radial tire according to claim 1, the rim having a rim flange for each bead portion, wherein when the tire is mounted on the rim and inflated to a standard inner pressure the height of the radially outer end of the turnup portion is 1.0 to 4.0 times the height of the rim flange.

7. The heavy duty radial tire according to claim 1, wherein when the tire is mounted on the rim and inflated to a standard inner pressure the absolute value of the difference between the height of the radially outer end of the bead reinforcing layer and the height of the radially outer end of the turnup portion is in the range of from 5 to 25 mm, the rubber strip extends beyond the upper radially outer end of the turnup portion or the bead reinforcing layer, whichever is higher, and the difference between the height of the radially outer end of the rubber strip and the height of the higher of said upper radially outer end of the turnup portion or bead reinforcing layer is in the range of from 0.25 to 1.0 times the height of the higher of said upper radially outer end, the bead portion is provided with a base and a chafer made of a hard rubber compound having a JIS-A hardness of from 70 to 90 degrees, said chafer extending along the bead base and the axially outer surface of the bead portion up to an end having a height more than the height of the radially outer end of the turnup portion, and more than the height of the radially outer end of the rubber strip, but less than the height of the bead apex.

8. The heavy duty radial tire according to claim 7, wherein the thickness of the bead apex measured at said upper radially outer end of the turnup portion or bead reinforcing layer is 0.3 to 0.8 times the thickness of the bead apex measured immediately outside the bead core.

* * * * *